(12) United States Patent
Smith

(10) Patent No.: US 7,268,526 B1
(45) Date of Patent: Sep. 11, 2007

(54) SWITCH MODE POWER SUPPLY CONTROL CIRCUIT

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/828,944

(22) Filed: Apr. 21, 2004

(51) Int. Cl.
*G05F 1/56* (2006.01)
*G05F 1/62* (2006.01)

(52) U.S. Cl. ...................... 323/285; 323/284
(58) Field of Classification Search ................ 323/271, 323/282, 284, 285, 351
See application file for complete search history.

(56) References Cited

U.S. PATENT DOCUMENTS

| | | | | |
|---|---|---|---|---|
| 4,535,399 A | * | 8/1985 | Szepesi | ........................ 363/41 |
| 4,754,277 A | * | 6/1988 | Voyce | ........................... 342/83 |
| 5,912,552 A | * | 6/1999 | Tateishi | ........................ 323/285 |
| 5,959,443 A | * | 9/1999 | Littlefield | .................... 323/287 |
| 6,064,187 A | * | 5/2000 | Redl et al. | ................... 323/285 |
| 6,204,649 B1 | * | 3/2001 | Roman | ........................ 323/282 |
| 6,476,589 B2 | * | 11/2002 | Umminger et al. | ......... 323/282 |
| 6,580,258 B2 | * | 6/2003 | Wilcox et al. | .............. 323/282 |
| 6,987,380 B1 | * | 1/2006 | Lee | .............................. 323/285 |

\* cited by examiner

*Primary Examiner*—Gary L Laxton
(74) *Attorney, Agent, or Firm*—Brett A. Hertzberg; Merchant & Gould PC

(57) ABSTRACT

An apparatus and method is arranged to dynamically adjust a pulse width (e.g., off-time pulse) associated with a switching device in a converter such as a buck converter, a boost converter, or a buck-boost regulator. A one-shot circuit is configured to dynamically initiate a pulse cycle for the switching converter when the output voltage collapses to a level that is related to a monitored inductor current in the converter. By changing the start time associated with the one-shot circuit, the pulse-width (e.g., off-time pulse) associated with the switching device is varied. In one example, the one-shot circuit is triggered when the inductor current is sensed as decaying below a threshold. The one-shot circuit can be further arranged to have another pulse-width (e.g., on-time pulse) that is adjusted for phase alignment with a reference frequency using a PLL circuit.

29 Claims, 8 Drawing Sheets

SWITCH MODE POWER SUPPLY CONTROL CIRCUIT

FIELD OF THE INVENTION

The present invention relates to a system and method for adjusting switching times in a converter such as a buck converter, a boost converter, or a buck-boost converter. A one-shot circuit is configured to dynamically initiate a pulse cycle for the switching converter when the output voltage collapses to a level that is related to a monitored inductor current in the converter.

BACKGROUND OF THE INVENTION

Buck converters are DC-to-DC converters that are arranged to provide an output voltage that is lower in magnitude than the input voltage. An example buck converter is illustrated in FIG. 1. The example buck converter includes an oscillator, an on-time control circuit, a driver circuit (DRV), a power switching device (PSW), a diode (D), an inductor (L), a capacitor (C), and a load circuit (LOAD).

The actuating of the power switching device (PSW) coincides with two operating phases. During the first operating phase, the power switching device couples energy from the input voltage source (VIN) to the inductor (L), the capacitor (C), and the load circuit (LOAD). During the second operating phase, the power switching device (PSW) is deactivated and the diode (D) allows the stored energy in the inductor (L) to continue flowing to the capacitor (C) and the load circuit (LOAD). At a later time interval, the oscillator and the on-time control circuit repeat the switching pattern.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
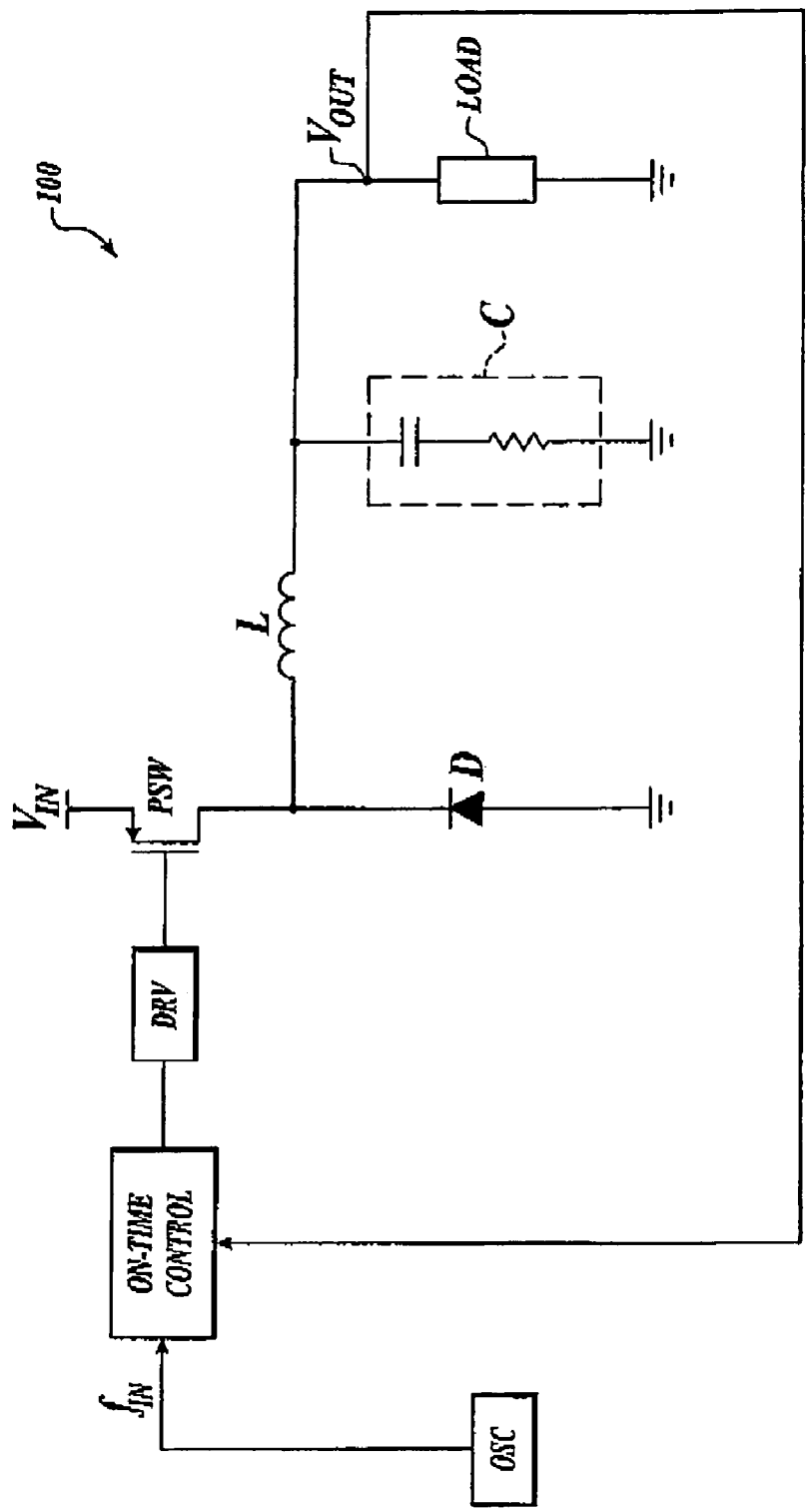
FIG. 1 is an illustration of a conventional buck converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to an apparatus and method for dynamically adjusting a pulse width (e.g., off-time pulse) associated with a switching device in a converter such as a buck converter, a boost converter, or a buck-boost regulator. A one-shot circuit is configured to dynamically initiate a pulse cycle for the switching converter when the output voltage collapses to a level that is related to a monitored inductor current in the converter. By changing the start time associated with the one-shot circuit, the pulse-width (e.g., off-time pulse) associated with the switching device is varied. In one example, the one-shot circuit is triggered when the inductor current is sensed as decaying below a threshold. The one-shot circuit can be further arranged to have another pulse-width (e.g., on-time pulse) that is adjusted for phase alignment with a reference frequency using a PLL circuit.

Figure 2:
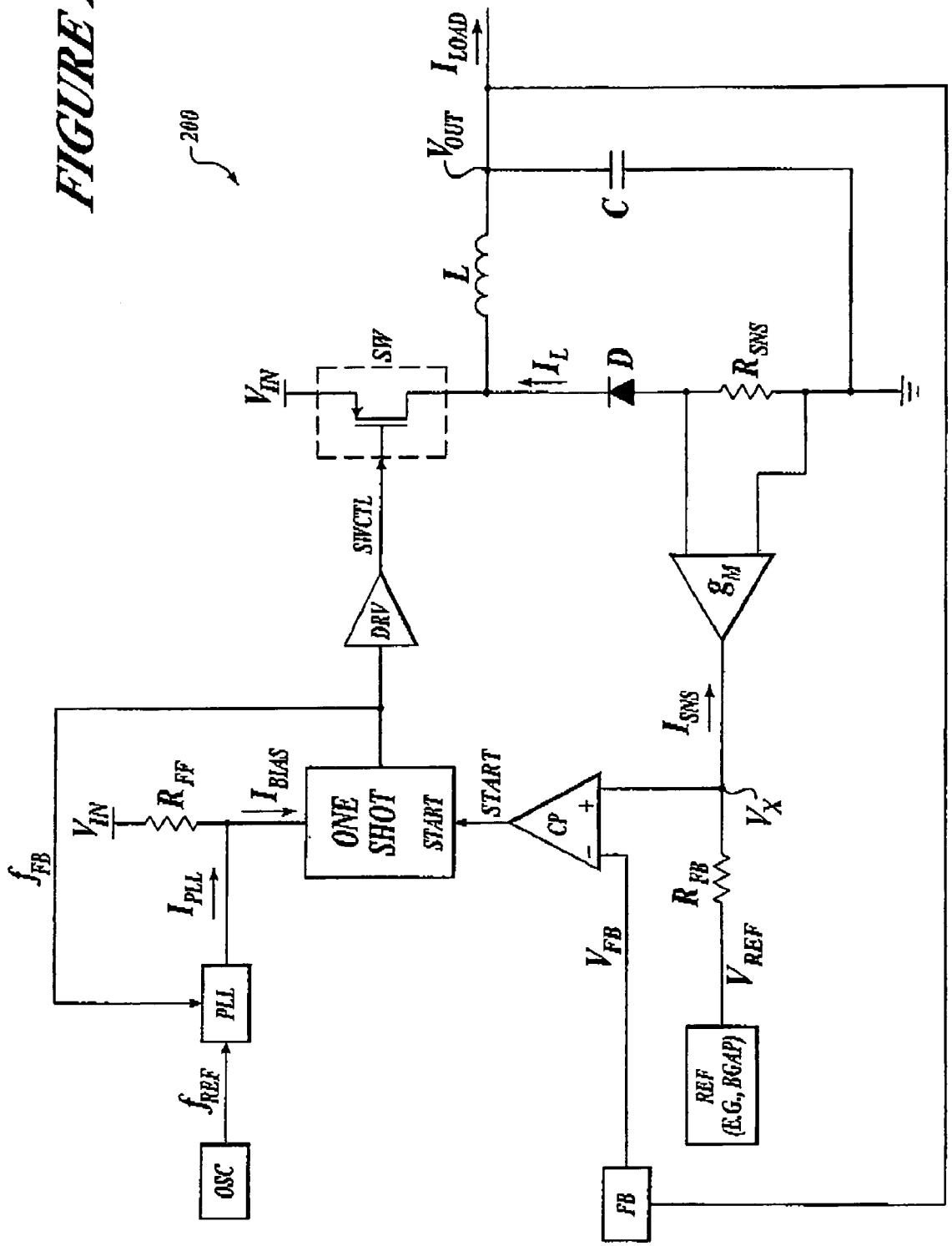
FIG. 2 is an illustration of an example embodiment of a buck converter.

FIG. 2 is an illustration of an example embodiment of a buck converter that is arranged according to at least one aspect of the present invention. The example buck converter includes an oscillator (OSC), a phase-locked loop (PLL) circuit, a one-shot circuit, a driver circuit (DRV), a switching device (SW), a diode (D), an inductor (L), a capacitor (C), three resistors ($R_{SNS}$, $R_{FB}$, $R_{FF}$), a reference circuit (REF), a feedback circuit (FB), trans-conductance amplifier ($g_m$) circuit, and a comparator circuit (CP).

The switching device (SW) is any appropriate switching device or circuit that is configured to selectively pass energy when activated. In one example, the switching device (SW) is a p-type device such as a metal oxide semiconductor device (MOS) or some other field effect device (FET). In another example, the switching device (SW) is an n-type device such as a metal oxide semiconductor device (MOS) or some other field effect device (FET).

The reference circuit (REF) can be any appropriate reference circuit that is arranged to provide a reference voltage ($V_{REF}$) to resistor $R_{FB}$. In one example, the reference circuit (REF) is a band-gap circuit.

Switching device SW is configured to couple energy to the inductor from the input source ($V_{IN}$) when operated in a closed-circuit position in response to a switch control signal (SWCTL). The diode (D) is arranged to permit current flow from the low supply (e.g., GND) through the inductor via resistor $R_{SNS}$ when the switching device is in an open-circuit position. The output of the one-shot circuit initiates actuation of the switching device via an optional driver circuit (DRV).

The comparator (CP) is arranged to trigger a start signal (START) for the one-shot circuit in response to a comparison between the sensed feedback voltage ($V_{FB}$) from the switching regulator and another voltage ($V_X$) that is related to the current ($I_L$) in the inductor (L) during the open-circuit condition for the switching device (SW).

In one example, the sensed feedback voltage ($V_{FB}$) corresponds to the output voltage ($V_{OUT}$) for the switching regulator. In another example, the sensed feedback voltage ($V_{FB}$) is related to the output voltage ($V_{OUT}$) by a gain scaling factor via a gain circuit (not shown). In still another example, the sensed feedback voltage ($V_{FB}$) is related to the output voltage ($V_{OUT}$) by a divider factor via a voltage divider circuit (e.g., see FIG. 5).

For the example illustrated in FIG. 2, voltage $V_X$ is generated by the cooperation of the trans-conductance amplifier ($g_m$) circuit, resistor $R_{SNS}$, resistor $R_{FB}$, and the reference voltage ($V_{REF}$). Resistor $R_{SNS}$ conducts current ($I_L$) through diode D and inductor L when switching device SW is operated in an open-circuit position. The voltage drop across resistor $R_{SNS}$ is determined by the product $I_L*R_{SNS}$. The $g_m$ circuit converts the sensed voltage into a current ($I_{SNS}$), which is given by: $I_{SNS}=g_m*I_L*R_{SNS}$. Resistor $R_{FB}$ is arranged to cooperate with the reference circuit and a sense current ($I_{SNS}$) to adjust a voltage ($V_X$) based on sensed output voltage from resistor $R_{SNS}$. The reference voltage ($V_{REF}$) provides a nominal value for voltage $V_X$ when the switching device (SW) is operated in a closed-circuit position. The overall value associated with voltage $V_X$ is given by:

$V_X=V_{REF}$, closed-circuit position of SW, and
$V_X=V_{REF}-g_m*I_L*R_{SNS}*R_{FB}$, open-circuit position of SW.

Figure 6C:
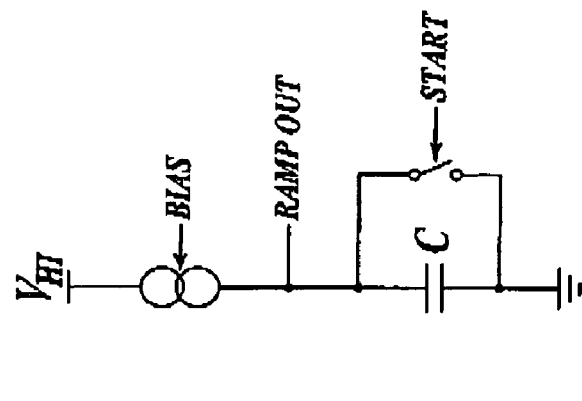
FIGS. 6A-6C illustrate various one-shot circuits, arranged in accordance with at least one aspect of the present invention.
Figure 6A:
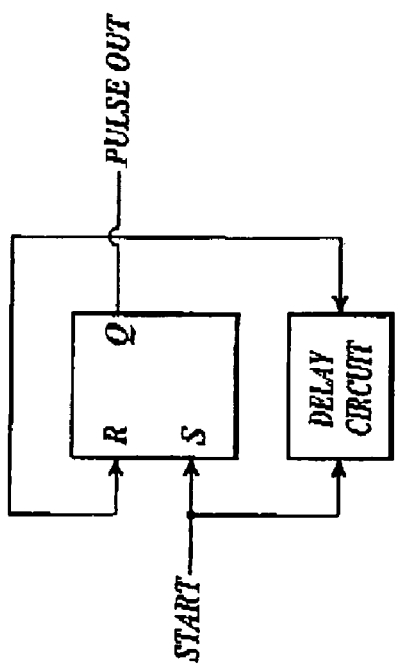
Figure 6B:
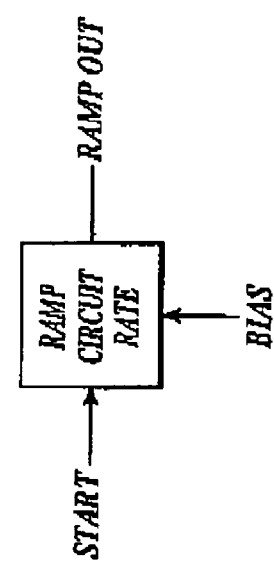

The one-shot circuit can be any appropriate circuit (See e.g., FIGS. 6A-6C) that is arranged to provide a pulse in response to a start signal. In one example, the one-shot circuit is simply an RS-type flip-flop circuit, where the start signal input corresponds to the set input (S). In another example, the one-shot circuit comprises an RS-type flip-flop circuit that is arranged to cooperate with a delay circuit. For this example, the flip-flop is set via the START signal, the delay circuit is initiated via the START signal, and the flip-flop is reset via an output of the delay circuit (See e.g., FIGS. 6B-6C).

The oscillator circuit (OSC), the phase-locked loop (PLL) circuit, and resistor $R_{FF}$ are optional circuits that can be used to adjust the pulse width associated with the one-shot circuit. The oscillator circuit (OSC) is arranged to provide a reference frequency ($f_{REF}$) to the PLL circuit. Another input of the PLL circuit is responsive to a feedback frequency signal ($f_{FB}$) that is provided by the output of the one-shot circuit. The output of the PLL circuit corresponds to a current ($I_{PLL}$) that is coupled to a biasing input of the one-shot circuit. Resistor $R_{FF}$ is coupled between the biasing input of the one-shot circuit and the input source ($V_{IN}$), such that the biasing current ($I_{BIAS}$) that is provided to the one-shot circuit is responsive to changes in the PLL output current and the input source ($V_{IN}$). The one-shot circuit has a programmable on-time that is responsive to the biasing current ($I_{BIAS}$).

In the buck regulator circuit illustrated in FIG. 2, the inductor (L) and the capacitor (C) are selected to provide sufficient energy storage to minimize the AC ripple in the output voltage. For example, the inductor value (L) can be selected based upon a desired ramp rate of current (di/dt=$\Delta$V/L). The combination of values for the inductor and the capacitor results in the formation of a system pole in the closed loop operation of the converter.

Figure 3:
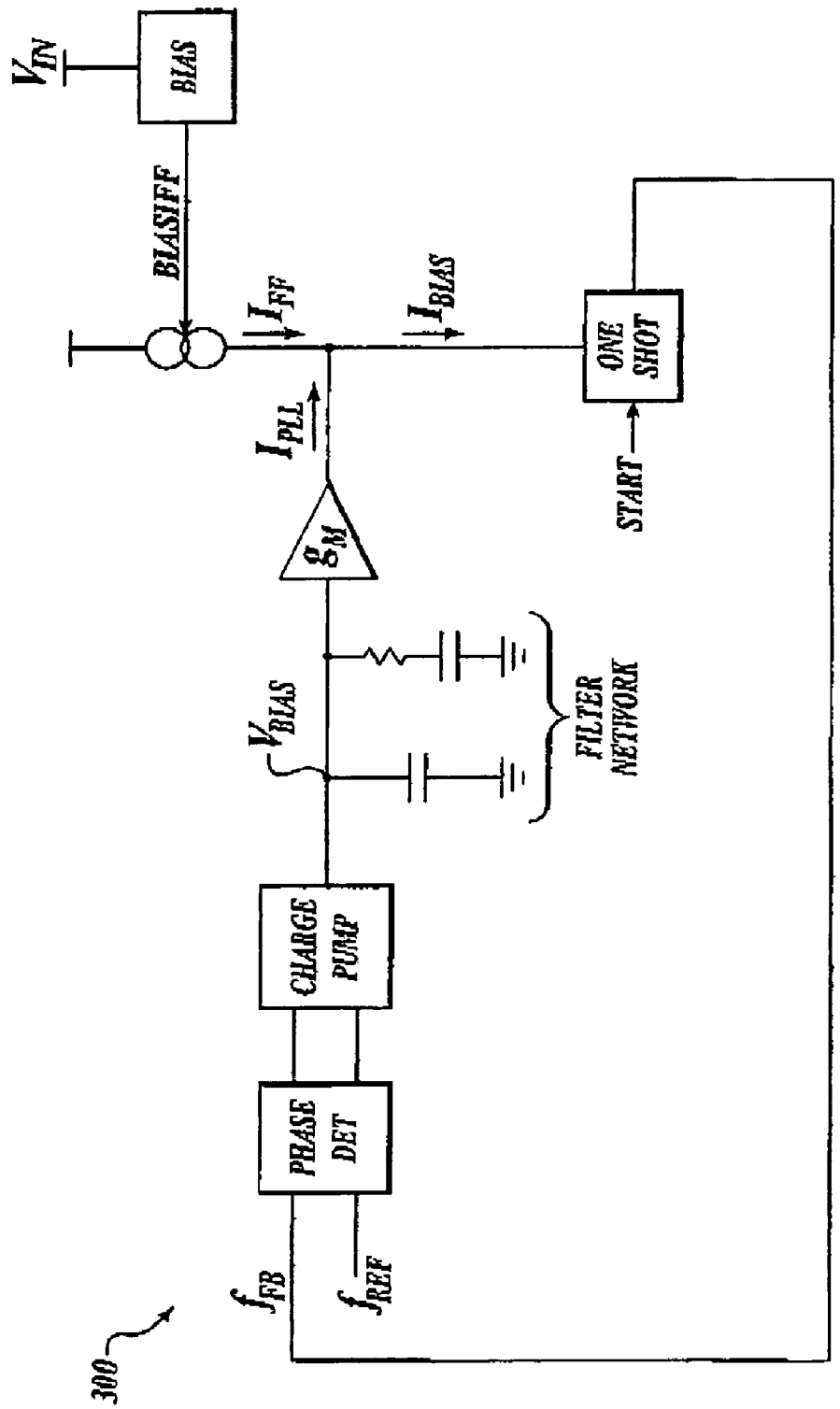
FIG. 3 is an illustration of an example PLL arrangement for a converter.

FIG. 3 is an illustration of an example PLL arrangement (300) for a converter that is arranged in accordance with at least one aspect of the present invention. The example PLL includes a phase detector, a charge pump, a first capacitor, a filter network, a trans-conductance ($g_m$) circuit, and a current source. An optional bias circuit (BIAS) can be arranged to bias the current source with a biasing signal (BIAS$_{FF}$) that is responsive to changes in the input voltage ($V_{IN}$). In another example, the current source function can be provided within the trans-conductance ($g_m$) circuit. The current source in FIG. 3 serves a similar purpose to resistor $R_{FF}$ from FIG. 2.

The phase detector compares the input frequency $f_{FB}$ from the one-shot circuit to the reference frequency ($f_{REF}$). The output of the phase detector is a pair of selection signals for selecting increasing and decreasing currents from the charge pump. The charge pump generates voltage $V_{BIAS}$ from by coupling the increasing and decreasing currents to the filter network. Voltage $V_{BIAS}$ is converted to a current ($I_{PLL}$) via the trans-conductance ($g_m$) circuit. The current source provides a current ($I_{FF}$) that is combined with current $I_{PLL}$ to provide a biasing current ($I_{BIAS}$) to the one-shot circuit.

The pulse-width associated with the one-shot circuit is responsive to the biasing current ($I_{BIAS}$). In one example, the pulse-width associated with the one-shot is related to a charge time associated with a capacitor, where the charge time is adjusted by changing the biasing current ($I_{BIAS}$). The PLL circuit is arranged to adjust the on-time associated with the switching device (or circuit) by adjusting the pulse-width associated with the one-shot circuit. The PLL circuit adjusts the pulse-width of the one-shot circuit so that the frequency ($f_{FB}$) of the one-shot circuit is phase aligned with the reference frequency ($f_{REF}$).

Although the above described PLL circuit required frequency compensation for proper operation, the frequency compensation is not dependent on the values associated with the inductor (L) and the capacitor (C). Since the inductor and capacitor can be selected independent of the PLL compensation, users of an integrated circuit implementation have increased power supply design flexibility. The frequency compensation of the PLL circuit is analyzed as follows below.

The one-shot circuit is arranged to generate a pulse that has a variable pulse-width ($t_{ON}$). The pulse-width ($t_{ON}$) is responsive to variations in a biasing current ($I_{BIAS}$), which is determined in part by a control voltage ($V_{BIAS}$). The frequency ($f_{FB}$) of the pulses from the one-shot circuit are related to the pulse-width ($t_{ON}$). For stable closed loop operation, changes in frequency $\Delta f_{FB}$ are directly related to changes in the biasing voltage ($\Delta V_{BIAS}$) as a constant ($K_{VCO}$). In other words, $K_{VCO}=\Delta f_{FB}/\Delta V_{BIAS}$.

For a buck converter, the duty cycle of the converter circuit is given as: duty cycle=$V_{OUT}/V_{IN}=t_{ON}*f_{FB}$. As described previously, the one-shot circuit has a delay that can be implemented (or modeled) as a current ($I_{OS}$) that is fed into a capacitor ($C_{OS}$) to generate a voltage ramp (e.g., see FIG. 6C). Current $I_{OS}$ has a level that is set by $I_{BIAS}$. The rate of the voltage ramp ($\Delta V/\Delta t$) on the capacitor ($C_{OS}$) is determined by the level of current $I_{OS}$ and the value of capacitor $C_{OS}$. Changes in the on-time interval ($\Delta t_{ON}$) for the converter corresponds are determined as: $\Delta t_{ON}=\Delta V_{OS}*C_{OS}/I_{BIAS}=\Delta V_{OS}*C_{OS}/I_{PLL}$, where: $I_{PLL}=V_{BIAS}*gm_{PLL}$, $\Delta V_{OS}$ corresponds to the change in voltage on capacitor $C_{OS}$, and $gm_{PLL}$ corresponds to the trans-conductance associated with the buffer in the PLL circuit.

The frequency from the output of the one-shot circuit ($f_{FB}$) is related to the on-time interval ($t_{ON}$) as: $f_{FB}=V_{OUT}/(V_{IN}*t_{ON})$. The ratio of the frequency of output pulses from the one shot circuit ($f_{FB}$) to the control voltage ($V_{BIAS}$) in the PLL is given by: $f_{FB}/V_{BIAS}=(V_{OUT}/(V_{IN}*t_{ON}))/V_{BIAS}$, which can be simplified to: $f_{FB}/V_{BIAS}=(V_{OUT}*gm_{PLL})/(V_{IN}*\Delta V_{OS}*C_{OS})$. In one example, $V_{OUT}=K*V_{REF}$ and $\Delta V_{OS}=m*V_{REF}$, where K is constant that is related to the feedback circuit and m is another constant. For this example, $K_{VCO}=K*gm_{PLL}/(V_{IN}*m*C_{OS})$. It is noteworthy that $K_{VCO}$ is independent of: the output voltage of the converter ($V_{OUT}$), the reference voltage ($V_{REF}$), and $\Delta V_{OS}$, such that the stability of the PLL is an independent parameter relative to the converter.

In another example, an optional bias circuit can be arranged to provide dynamic $g_m$ of the trans-conductance circuit in the PLL. For this example, $gm_{PLL}=k*V_{IN}$ and $K_{VCO}$ is simplified further to: $K_{VCO}=K*k*gm_{PLL}/(m*C_{OS})$. A similar arrangement can be provided via the current source illustrated in the PLL circuit shown in FIG. 3.

Figure 4A:
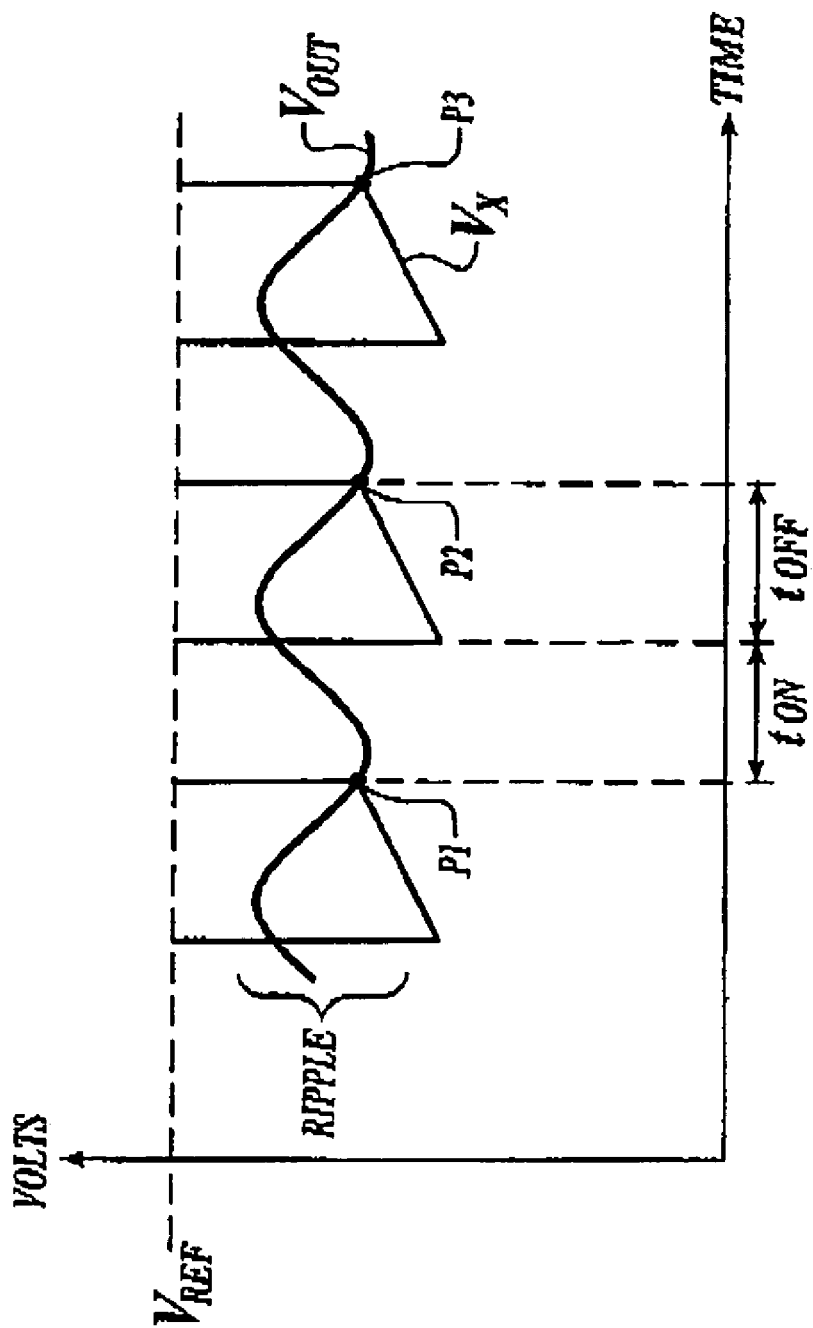
FIGS. 4A-4C are illustrations of various waveforms during the operation of a converter.
Figure 4B:
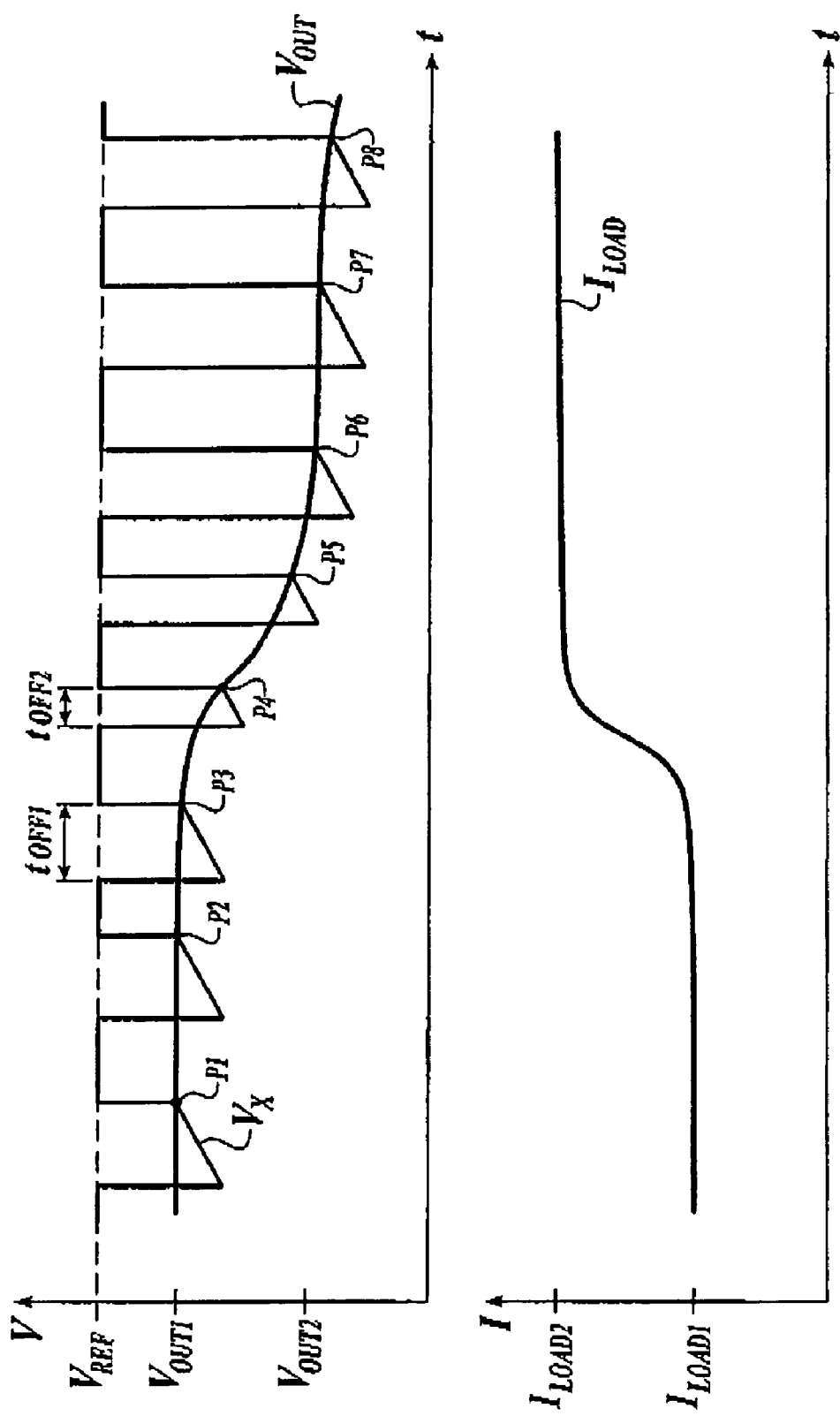
Figure 4C:
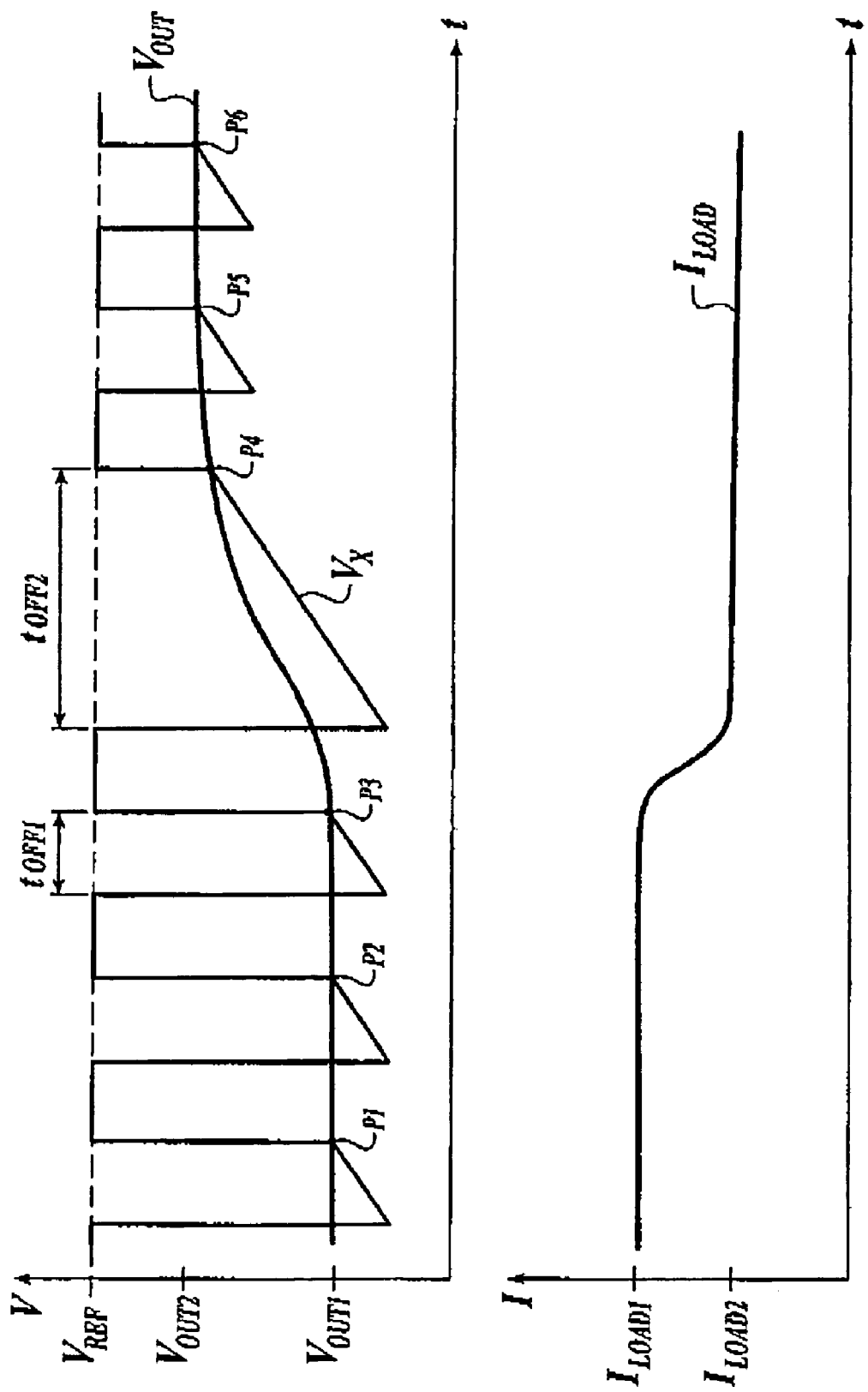

FIGS. 4A-4C are illustrations of various waveforms during the operation of a converter that is arranged in accordance with at least one aspect of the present invention. For each of the figures, the switching device (or circuit) is in: a closed-circuit operating condition during an on-time interval ($t_{ON}$), and an open-circuit operating condition during an off-time interval ($t_{OFF}$).

In FIG. 4A, the load condition is relatively constant such that the output voltage ($V_{OUT}$) various over a limited range such as a ripple in the voltage. A first on-time interval is initiated at point $P_1$ for a defined pulse width. During the on-time interval ($t_{ON}$), energy is stored in the inductor of the switching regulator such that the output voltage increases, and voltage $V_X$ corresponds to $V_{REF}$. After the on-time interval expires, the off-time interval commences for a variable time duration ($t_{OFF}$). During the off-time interval the output voltage ($V_{OUT}$) decreases. The off-time interval ($t_{OFF}$) is terminated when the sensed inductor current ($I_L$) decays sufficiently that voltage $V_X$ intersects the output voltage ($V_{OUT}$) as illustrated by point $P_2$. Voltage VX appears as a chopped saw-tooth waveform as illustrated in the figure.

In FIG. 4B, the current demanded from the load increases from a first load condition ($I_{LOAD1}$) to a second load condition ($I_{LOAD2}$). During the first load condition ($I_{LOAD1}$), the output voltage has a nominal value corresponding to $V_{OUT1}$ and the pulse width associated with the off-time interval ($t_{OFF1}$) remains relatively constant. At point $P_3$, the load condition begins to change and output voltage ($V_{OUT}$) begins to decrease. At the next off-time interval ($t_{OFF2}$), the off time is shortened relative to the preceding off-time interval ($t_{OFF1}$) since voltage $V_X$ intersects the output voltage in a shortened time period as illustrated by point $P_4$. After the load transition stabilizes, the output voltage settles to a new nominal value corresponding to $V_{OUT2}$ and the pulse-width of the off-time interval becomes relatively constant. The effect is an instantaneous increase in duty cycle, which allows an increase in current that is rapidly delivered to the output.

In FIG. 4C, the current demanded from the load decreases from a first load condition ($I_{LOAD1}$) to a second load condition ($I_{LOAD2}$). During the first load condition ($I_{LOAD1}$), the output voltage has a nominal value corresponding to $V_{OUT1}$ and the pulse width associated with the off-time interval ($t_{OFF1}$) remains relatively constant. At point $P_3$, the load condition begins to change and output voltage ($V_{OUT}$) begins to increase. At the next off-time interval ($t_{OFF2}$), the pulse-width is extended relative to the preceding time off-time interval ($t_{OFF1}$) since voltage $V_X$ intersects the output voltage in an extended time period as illustrated by point $P_4$. After the load transition stabilizes, the output voltage settles to a new nominal value corresponding to $V_{OUT2}$ and the pulse-width of the off-time interval becomes relatively constant.

As illustrated by FIG. 4B, the output voltage decreases when the load demands more current (increased load condition). As illustrated by FIG. 4C, the output voltage increases when the load decreases its current demand (decreased load condition). The net effect of FIGS. 4A-4C is that the output voltage (VOUT) is related to the load condition with a measurable load-line characteristic. By adjusting the scaling factors (e.g., $g_m$, $R_{SNS}$, $R_{FB}$, $V_{REF}$, etc.) a defined range for load-lines can be provided. Although the output voltage has shifted due to the change in the load condition, the ripple factor is maintained at a minimum level.

Figure 5:
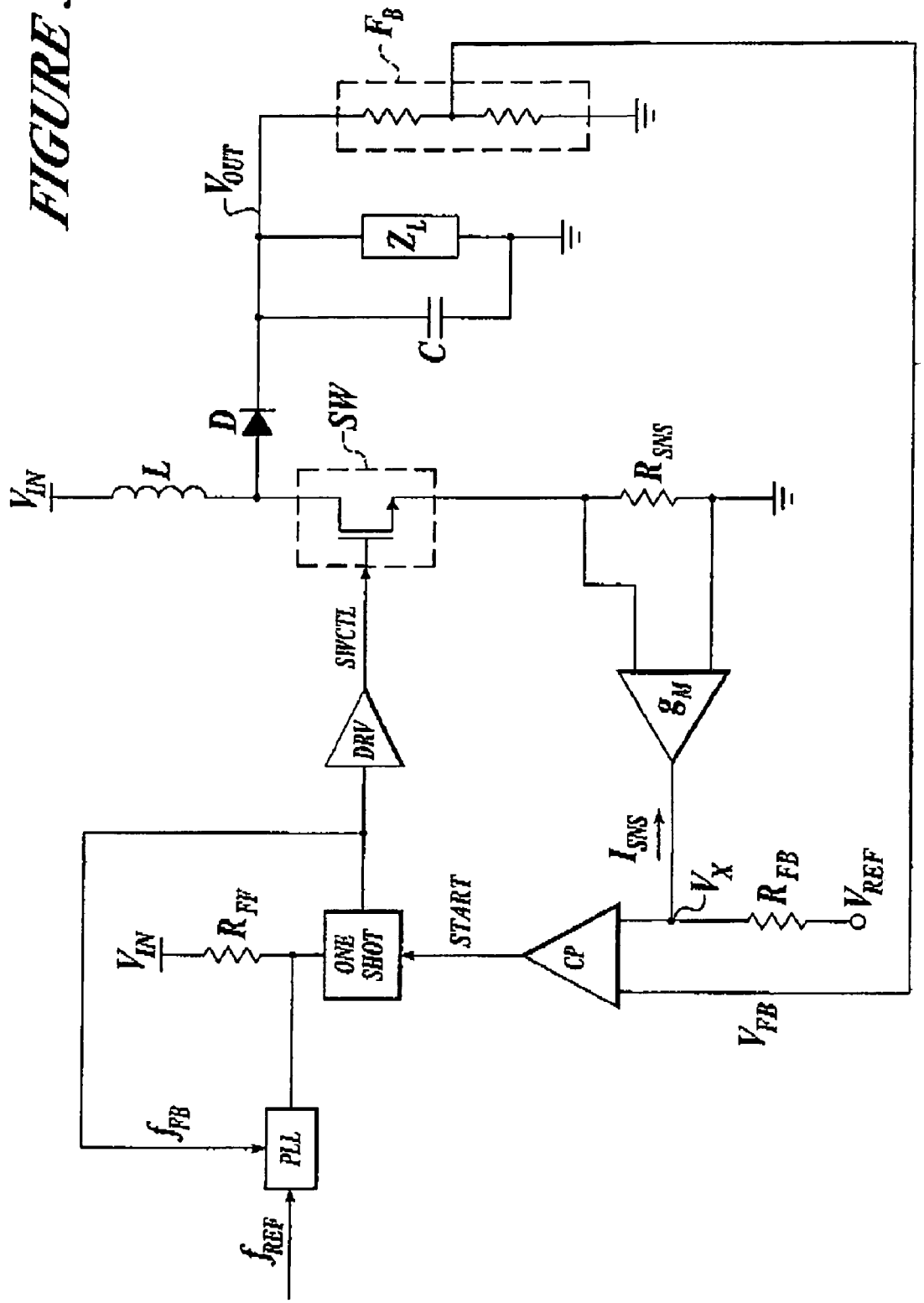
FIG. 5 illustrates an example embodiment of a boost converter.

FIG. 5 illustrates an example embodiment of a boost converter that is arranged in accordance with at least one aspect of the present invention. The example boost converter includes a phase-locked loop (PLL) circuit, a one-shot circuit, a driver circuit (DRV), a switching device (SW), a diode (D), an inductor (L), a capacitor (C), three resistors ($R_{SNS}$, $R_{FB}$, $R_{FF}$), a feedback circuit (FB), a trans-conductance amplifier ($g_m$) circuit, a comparator circuit (CP), and a load circuit ($Z_L$).

The example switching device (SW) illustrated in FIG. 5 is an n-type transistor. The switching device (SW) is coupled between the inductor and resistor $R_{SNS}$ such that the inductor is charged by approximately the full supply voltage when the switching device is activated in response to a switch control signal (SWCTL). The diode (D) is arranged to permit current to flow from the input source (VIN) through the inductor to the capacitor (C), the load circuit ($Z_L$), and the feedback circuit (FB). The output of the one-shot circuit initiates actuation of the switching device via an optional driver circuit (DRV).

The comparator (CP) is arranged to trigger a start signal (START) for the one-shot circuit in response to a comparison between the sensed feedback voltage ($V_{FB}$) from the switching regulator and another voltage ($V_X$) that is related to the current ($I_L$) in the inductor (L) during the closed-circuit condition for the switching device (SW). In FIG. 5, the sensed feedback voltage ($V_{FB}$) is related to the output voltage ($V_{OUT}$) by a divider factor via a voltage divider circuit that is illustrated as two resistors. Other voltage divider circuits can be employed including, an active voltage divider, two or more stacked diodes, a capacitive divider, or some other combination of circuits arranged to provide a divider function.

The operation of the trans-conductance amplifier ($g_m$) circuit, the comparator circuit, and the one-shot circuit is substantially similar to that previously described. However, the one-shot circuit is triggered during the on-time of the switching device (or circuit) such that the output voltage ($V_{OUT}$) is boosted relative to the input supply ($V_{IN}$).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A switched mode power converter that is arranged to provide an output signal to a load circuit, the switched mode power converter comprising:
   an inductor;
   a switching circuit that is coupled to the inductor and arranged to periodically energize the inductor in response to a control signal, wherein the switching circuit is operated in: a closed circuit position during a first operating phase of the converter, and an open circuit position during a second operating phase of the converter;

a sense circuit that is arranged to provide a sense signal at a sense terminal, wherein a reference signal is coupled to the sense terminal via a resistor such that the sense terminal is a summing junction that generates the sense signal as a difference between a sensed current in the inductor and the reference signal only during a selected operating phase of the converter, wherein the reference signal is different from a signal ground associated with the switched mode power converter, wherein the selected operating phase corresponds to one of the first and second operating phases of the converter, and wherein a non-selected operating phase of the converter corresponds to the other of the first and second operating phases of the converter, wherein the sense circuit is arranged such that the sense signal is variable over more than two values, wherein the sense signal at the sense terminal corresponds to the reference signal during the non-selected operating phase;

a feedback circuit that is arranged to provide a feedback signal at a feedback terminal in response to an output signal of the converter, wherein the feedback circuit is arranged such that the feedback signal is variable over more than two values;

a comparator circuit that includes a first input that is the feedback terminal, a second input that is the sense terminal, and an output that is arranged to assert a start signal when the feedback signal and the sense signal are approximately equal during the selected operating phase of the converter; and a one-shot circuit that is arranged to initiate the control signal when the start signal is asserted such that the control signal has a variable pulse-width during the non-selected operating phase of the converter, wherein the inductor, the switching circuit, the sense circuit, the feedback circuit, the comparator circuit, and the one shot circuit are arranged such that error amplifier and associated compensation circuits are unnecessary in the switched mode power converter.

2. The switched mode power converter of claim 1, the switching circuit comprising at least one of: an n-type FET device, a p-type FET device, an n-type MOS device, and a p-type MOS device.

3. A switched mode power converter that is arranged to provide an output signal to a load circuit, the switched mode power converter comprising:

an inductor;

a switching circuit that is coupled to the inductor and arranged to periodically energize the inductor in response to a control signal, wherein the switching circuit is operated in: a closed circuit position during a first operating phase of the converter, and an open circuit position during a second operating phase of the converter;

a sense circuit that is arranged to provide a sense signal at a sense terminal that is related to a current in the inductor and a reference voltage only during a selected operating phase of the converter, wherein the selected operating phase corresponds to one of the first and second operating phases of the converter, and wherein a non-selected operating phase of the converter corresponds to the other of the first and second operating phases of the converter, the sense circuit comprising: a resistor circuit that is coupled between a reference terminal and the sense terminal, and a current sense circuit that is coupled to the resistor circuit via the sense terminal, wherein the reference terminal is arranged to receive the reference voltage, the resistor circuit has a corresponding resistance value, and the current sense circuit is arranged to provide a sense current to the resistor circuit such that the sense signal at the sense terminal corresponds to the difference between the reference voltage and a product of the sense current and the resistance value of the resistor circuit during the selected operating phase, and the sense signal at the sense terminal corresponds to the reference voltage during the non-selected operating phase;

a feedback circuit that is arranged to provide a feedback signal in response to an output signal of the converter at a feedback terminal;

a comparator circuit that includes a first input that is coupled to the feedback terminal, a second input that is coupled to the sense terminal, and an output that is arranged to assert a start signal when the feedback signal and the sense signal are approximately equal during the selected operating phase of the converter; and a one-shot circuit that is arranged to initiate the control signal when the start signal is asserted such that the control signal has a variable pulse-width during the non-selected operating phase of the converter, wherein the inductor, the switching circuit, the sense circuit, the feedback circuit, the comparator circuit, and the one shot circuit are arranged such that error amplifier and associated compensation circuits are unnecessary in the switched mode power converter.

4. A switched mode power converter that is arranged to provide an output signal to a load circuit, the switched mode power converter comprising:

an inductor;

a switching circuit that is coupled to the inductor and arranged to periodically energize the inductor in response to a control signal, wherein the switching circuit is operated in: a closed circuit position during a first operating phase of the converter, and an open circuit position during a second operating phase of the converter;

a sense circuit that is arranged to provide a sense signal at a sense terminal that is related to a current in the inductor only and a reference voltage during a selected operating phase of the converter, wherein the selected operating phase corresponds to one of the first and second operating phases of the converter, and wherein a non-selected operating phase of the converter corresponds to the other of the first and second operating phases of the converter, the sense circuit comprising: a first resistor that is coupled between the switching circuit and a supply terminal, a trans-conductance circuit that is arranged to provide a sense current to the sense terminal in response to a voltage across the first resistor, and a second resistor that is coupled between a reference voltage and the sense terminal such that the sense signal corresponds to a voltage associated with the sense terminal, wherein the sense signal at the sense terminal corresponds to the reference voltage during the non-selected operating phase;

a feedback circuit that is arranged to provide a feedback signal at a feedback terminal in response to an output signal of the converter;

a comparator circuit that includes a first input that is coupled to the feedback terminal, a second input that is coupled to the sense terminal, and an output that is arranged to assert a start signal when the feedback signal and the sense signal are approximately equal during the selected operating phase of the converter; and a one-shot circuit that is arranged to initiate the control signal when the start signal is asserted such that the control signal has a variable pulse-width during the non-selected operating phase of the converter, wherein the inductor, the switching circuit, the sense circuit, the feedback circuit, the comparator circuit, and the one shot circuit are arranged such that error amplifier and associated compensation circuits are unnecessary in the switched mode power converter.

5. The switched mode power converter of claim 4, wherein the first resistor corresponds to at least one of: a metal interconnect material that is coupled to the switching circuit, a resistive material that is coupled to the switching circuit, and an on-resistance that is associated with the switching circuit.

6. The switched mode power converter of claim 4, wherein the switching circuit is arranged to couple current from the inductor to the first resistor during the first operating phase of the converter.

7. The switched mode power converter of claim 4, further comprising a diode that is arranged to couple current through the first resistor and the inductor during the second operating phase of the converter.

8. The switched mode power converter of claim 4, wherein the reference voltage is provided by a band-gap circuit.

9. The switched mode power converter of claim 1, wherein the feedback circuit is arranged such that the feedback signal is one of: equal to the output signal, an offset version of the output signal, a gain scaled version of the output signal, or a divided version of the output signal.

10. The switched mode power converter of claim 1, wherein the feedback circuit corresponds to one of: a direct connection, a unity gain amplifier circuit, an amplifier circuit with a gain of less than one, an amplifier circuit with a gain of greater than one, a resistor divider circuit, a capacitor divider circuit, or a stacked diode circuit.

11. The switched mode power converter of claim 1, wherein the one-shot circuit comprises at least one of: an RS-type flip-flop circuit, a delay circuit, and a ramp generator circuit.

12. The switched mode power converter of claim 1, wherein the one-shot circuit comprises a ramp generator circuit that has an adjustable ramp rate that is variable in response to a bias signal.

13. A switched mode power converter that is arranged to provide an output signal to a load circuit, the switched mode power converter comprising, an inductor;

a switching circuit that is coupled to the inductor and arranged to periodically energize the inductor in response to a control signal, wherein the switching circuit is operated in: a closed circuit position during a first operating phase of the converter, and an open circuit position during a second operating phase of the converter;

a sense circuit that is arranged to provide a sense signal at a sense terminal, wherein a reference signal is coupled to the sense terminal via a resistor such that the sense terminal is a summing junction that generates a difference signal as a difference between a sensed current in the inductor and the reference signal during a selected operating phase of the converter, wherein the reference signal is different from a signal ground associated with the switched mode power converter, wherein the selected operating phase corresponds to one of the first and second operating phases of the converter, and wherein a non-selected operating phase of the converter corresponds to the other of the first and second operating phases of the converter, wherein the sense circuit is arranged such that the sense signal corresponds to the reference signal during the non-selected operating phase;

a feedback circuit that is arranged to provide a feedback signal at a feedback terminal in response to an output signal of the converter;

a comparator circuit that includes a first input that is the feedback terminal, a second input that is the sense terminal, and an output that is arranged to assert a start signal when the feedback signal and the sense signal are approximately equal during the selected operating phase of the converter;

a one-shot circuit that is arranged to initiate the control signal when the start signal is asserted such that the control signal has a pulse-width that is varied during the non-selected operating phase of the converter, wherein the inductor, the switching circuit, the sense circuit, the feedback circuit, the comparator circuit, and the one shot circuit are arranged such that error amplifier and associated compensation circuits are unnecessary in the switched mode power converter, wherein the one-shot circuit is arranged to adjust the pulse-width in response to a bias signal for the one-shot circuit; and a PLL circuit that is arranged to provide the bias signal for the one-shot circuit based on a comparison between a reference frequency and a feedback frequency that is associated with the control signal.

14. The switching mode power converter of claim 13, wherein the PLL circuit is arranged to phase align the reference frequency and the feedback frequency.

15. The switching mode power converter of claim 13, wherein the PLL circuit comprises a trans-conductance circuit that is arranged to provide at least a portion of the biasing signal.

16. The switched mode power converter of claim 15, further comprising a current source that is arranged to provide another portion of the biasing signal.

17. The switched mode power converter of claim 16, wherein the current source is arranged such that the other portion of the biasing signal varies proportional to changes in a supply voltage.

18. The switched mode power converter of claim 16, wherein the current source is arranged to set a minimum operating frequency for the PLL circuit.

19. The switched mode power converter of claim 15, further comprising a resistor that is arranged to provide another portion of the biasing signal.

20. The switched mode power converter of claim 15, wherein the trans-conductance circuit has a trans-conductance parameter that varies proportional to changes in a supply voltage.

21. The switched mode power converter of claim 1, further comprising a diode, wherein the switching circuit is arranged to couple energy from an input terminal to the inductor such that the inductor is charged during the first operating phase of the converter, and wherein the diode is arranged to provide a conduction path for the inductor during the second operating phase of the converter.

22. The switched mode power converter of claim 1, further comprising a diode that is arranged to permit current to flow to the load circuit from the inductor, wherein the switching circuit is arranged to couple the inductor between an input terminal and a ground terminal such that the inductor is charged during the first operating phase of the converter.

23. A switched mode power converter that is arranged to provide an output signal to a load circuit, the switched mode power converter comprising:
    an inductor;
    a switching means for periodically energizing the inductor in response to a control signal, wherein the switching means is operated in: a closed circuit position during a first operating phase of the converter, and an open circuit position during a second operating phase of the converter;
    a sense means for providing a sense signal at a sense terminal, wherein a reference signal is coupled to the sense terminal via a resistor such that the sense terminal is a summing junction that generates the sense signal as a difference between a sensed current in the inductor and the reference signal only during a selected operating phase of the converter, wherein the reference signal is different from a signal ground associated with the switched mode power converter, wherein the selected operating phase corresponds to one of the first and second operating phases of the converter, and wherein a non-selected operating phase of the converter corresponds to the other of the first and second operating phases of the converter, wherein the sense means is arranged such that the sense signal is variable over more than two values, wherein the sense signal at the sense terminal corresponds to the reference signal during the non-selected operating phase;
    a comparison means that includes a first input that is the sense terminal, and a second input responsive to an output signal associated with the load circuit, and an output for providing a start signal, wherein the comparison means is arranged for asserting a start signal when the output signal associated with the load circuit reaches a threshold during the selected operating phase of the converter, wherein the output signal is variable over more than two values, and wherein the threshold is associated with the sense signal; and
    a pulse means for initiating the control signal when the start signal is asserted such that the control signal has a variable pulse-width during the non-selected operating phase of the converter, wherein the inductor, the switching means, the sense means, the comparison means, and the pulse means are arranged such that error amplifier and associated compensation circuits are unnecessary in the switched mode power converter.

24. The switched mode power converter of claim 23, further comprising a phase-locked-loop means for adjusting a pulse-width associated with control signal during the selected operating phase of the converter.

25. A method for adjusting pulse widths associated with a control signal in a switched mode power converter that does not use an error amplifier and any associated compensation circuits, the method comprising:
    periodically energizing an inductor with a switching circuit that is responsive to the control signal, wherein the switching circuit is operated in: a closed circuit position during a first operating phase of the converter, and an open circuit position during a second operating phase of the converter;
    providing a sense signal at a sense terminal, wherein a reference signal is coupled to the sense terminal via a resistor such that the sense terminal is a summing junction that generates the sense signal as a difference between a sensed current in the inductor and the reference signal only during a selected operating phase of the converter, wherein the reference signal is different from a signal ground associated with the switched mode power converter, wherein the selected operating corresponds to one of the first and second operating phases of the converter, and wherein a non-selected operating phase of the converter corresponds to the other of the first and second operating phases of the converter, wherein the sense signal is variable over more than two values, wherein the sense signal at the sense terminal corresponds to the reference signal during the non-selected operating phase;
    comparing an output signal associated with the load circuit to the sense signal from the sense terminal;
    asserting a start signal in response to the comparison when the output signal associated with the load circuit reaches a threshold during the selected operating phase of the converter, wherein the output signal is variable over more than two values, and wherein the threshold is associated with the sense signal; and
    initiating the control signal when the start signal is asserted such that the control signal has a variable pulse-width during the non-selected operating phase of the converter.

26. The method of claim 25, further comprising adjusting a pulse-width associated with control signal during the selected operating phase of the converter with a phase locked loop.

27. A switched mode power converter that is arranged to provide an output signal to a load circuit, the switched mode power converter comprising:
    an inductor;
    a switching means for periodically energizing the inductor in response to a control signal, wherein the switching means is operated in: a closed circuit position during a first operating phase of the converter, and an open circuit position during a second operating phase of the converter;
    a sense means for providing a sense signal at a sense terminal, wherein a reference signal is coupled to the sense terminal via a resistor such that the sense terminal is a summing junction that generates the sense signal as a difference between a sensed current in the inductor and the reference signal during a selected operating phase of the converter, wherein the reference signal is different from a signal ground associated with the switched mode power converter, wherein the selected operating phase corresponds to one of the first and second operating phases of the converter, and wherein a non-selected operating phase of the converter corresponds to the other of the first and second operating phases of the converter, wherein the sense means is arranged such that the sense signal is variable over more than two values, wherein the sense signal at the sense terminal corresponds to the reference signal during the non-selected operating phase;
    an isolation means that is arranged to isolate the sense means from the inductor during the non-selected operating phase of the converter;
    a comparison means for comparing an output signal associated with the load circuit to the sense signal and asserting a start signal when the output signal associated with the load circuit reaches a threshold during the selected operating phase of the converter, wherein the output signal is variable over more than two values, and wherein the threshold is associated with the sense signal; and a pulse means for initiating the control signal when the start signal is asserted such that the control signal has a variable pulse-width during the non-selected operating phase of the converter, wherein the inductor, the switching means, the sense means, the isolation means, the comparison means, and the pulse means are arranged such that error amplifier and associated compensation circuits are unnecessary in the switched mode power converter.

28. A switched mode power converter that is arranged to provide an output signal to a load circuit, the switched mode power converter comprising:

an inductor;

a switching circuit that is coupled to the inductor and arranged to periodically energize the inductor in response to a control signal, wherein the switching circuit is operated in: a closed circuit position during a first operating phase of the converter, and an open circuit position during a second operating phase of the converter;

a sense circuit that is selectively coupled to the inductor during a selected operating phase of the converter via the switching circuit, and wherein the sense circuit is decoupled from the inductor during the non-selected operating phase of the converter, wherein the sense circuit is arranged to provide a sense signal at a sense terminal, wherein a reference signal is coupled to the sense terminal via a resistor such that the sense terminal is a summing junction that generates the sense signal as a difference between a sensed current in the inductor and the reference signal during the selected operating phase of the converter, wherein the reference signal is different from a signal ground associated with the switched mode power converter, wherein the selected operating phase corresponds to one of the first and second operating phases of the converter, and wherein the non-selected operating phase of the converter corresponds to the other of the first and second operating phases of the converter, wherein the sense signal is variable over more than two values, wherein the sense signal at the sense terminal corresponds to the reference signal during the non-selected operating phase;

a feedback circuit that is arranged to provide a feedback signal at a feedback terminal in response to an output signal of the converter, wherein the feedback circuit is arranged such that the feedback signal is variable over more than two values;

a comparator circuit that includes a first input that is coupled to the feedback terminal, a second input that is coupled to the sense terminal, and an output that is arranged to assert a start signal when the feedback signal and the sense signal are approximately equal during the selected operating phase of the converter; and a one-shot circuit that is arranged to initiate the control signal when the start signal is asserted such that the control signal has a variable pulse-width during the non-selected operating phase of the converter, wherein the inductor, the switching circuit, the sense circuit, the feedback circuit, the comparator circuit, and the one shot circuit are arranged such that error amplifier and associated compensation circuits are unnecessary in the switched mode power converter.

29. A switched mode power converter that is arranged to provide an output signal to a load circuit, the switched mode power converter comprising:

an inductor;

a switching circuit that is coupled to the inductor and arranged to periodically energize the inductor in response to a control signal, wherein the switching circuit is operated in: a closed circuit position during a first operating phase of the converter, and an open circuit position during a second operating phase of the converter;

a sense circuit that is selectively coupled to the inductor during a selected operating phase of the converter, and wherein the sense circuit is decoupled from the inductor during the non-selected operating phase of the converter, wherein the sense circuit is arranged to provide a sense signal at a sense terminal, wherein a reference signal is coupled to the sense terminal via a resistor such that the sense terminal is a summing junction that generates the sense signal as a difference between a sensed current in the inductor and the reference signal during the selected operating phase of the converter, wherein the reference signal is different from a signal ground associated with the switched mode power converter, wherein the selected operating phase corresponds to one of the first and second operating phases of the converter, and wherein the non-selected operating phase of the converter corresponds to the other of the first and second operating phases of the converter, wherein the sense signal at the sense terminal corresponds to the reference signal during the non-selected operating phase;

a diode circuit that is arranged to: couple the sense circuit to the inductor during the selected operating phase of the converter, and isolate the sense circuit from the inductor during the non-selected operating phase of the converter;

a feedback circuit that is arranged to provide a feedback signal at a feedback terminal in response to an output signal of the converter;

a comparator circuit that includes a first input that is the feedback terminal, a second input that is the sense terminal, and an output that is arranged to assert a start signal when the feedback signal and the sense signal are approximately equal during the selected operating phase of the converter; and a one-shot circuit that is arranged to initiate the control signal when the start signal is asserted such that the control signal has a variable pulse-width during the non-selected operating phase of the converter, wherein the inductor, the switching circuit, the sense circuit, the diode circuit, the feedback circuit, the comparator circuit, and the one shot circuit are arranged such that error amplifier and associated compensation circuits are unnecessary in the switched mode power converter.

* * * * *